(12) United States Patent
Nishiura

(10) Patent No.: US 12,410,312 B2
(45) Date of Patent: Sep. 9, 2025

(54) PHOTOCURABLE RESIN COMPOSITION FOR THREE-DIMENSIONAL MODELING AND METHOD FOR PRODUCING ARTICLE

(71) Applicant: CANON KABUSHIKI KAISHA, Tokyo (JP)

(72) Inventor: Chiaki Nishiura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 211 days.

(21) Appl. No.: 17/602,713

(22) PCT Filed: Mar. 27, 2020

(86) PCT No.: PCT/JP2020/014137
§ 371 (c)(1),
(2) Date: Feb. 24, 2022

(87) PCT Pub. No.: WO2020/209105
PCT Pub. Date: Oct. 15, 2020

(65) Prior Publication Data
US 2024/0384088 A1    Nov. 21, 2024

(30) Foreign Application Priority Data

Apr. 11, 2019 (JP) ................... 2019-075945
Mar. 25, 2020 (JP) ................... 2020-054575

(51) Int. Cl.
| | | |
|---|---|---|
| C08F 2/46 | (2006.01) |
| B33Y 70/00 | (2020.01) |
| C08F 2/50 | (2006.01) |
| C08F 222/22 | (2006.01) |
| C08G 18/10 | (2006.01) |
| C08G 61/04 | (2006.01) |
| C08L 35/02 | (2006.01) |
| B29C 64/135 | (2017.01) |
| B29K 23/00 | (2006.01) |
| B29K 33/00 | (2006.01) |
| B29K 75/00 | (2006.01) |
| B29K 79/00 | (2006.01) |
| B29K 105/16 | (2006.01) |
| B29K 423/00 | (2006.01) |
| B33Y 10/00 | (2015.01) |
| B33Y 40/20 | (2020.01) |

(52) U.S. Cl.
CPC ............. *C08L 35/02* (2013.01); *B33Y 70/00* (2014.12); *C08F 222/22* (2013.01); *C08G 18/10* (2013.01); *B29C 64/135* (2017.08); *B29K 2023/16* (2013.01); *B29K 2033/08* (2013.01); *B29K 2033/26* (2013.01); *B29K 2075/00* (2013.01); *B29K 2079/085* (2013.01); *B29K 2105/16* (2013.01); *B29K 2423/06* (2013.01); *B29K 2995/0073* (2013.01); *B29K 2995/0087* (2013.01); *B29K 2995/0088* (2013.01); *B29K 2995/0089* (2013.01); *B29K 2995/0094* (2013.01); *B33Y 10/00* (2014.12); *B33Y 40/20* (2020.01)

(58) Field of Classification Search
CPC ......... B33Y 70/00; B33Y 70/10; B33Y 10/00; B33Y 40/20; C08F 222/40; C08F 222/102; C08F 222/22; C08F 222/56; C08F 2/44; C08G 18/10; C08L 33/26; C08L 35/02; C08L 75/16; B29C 64/314; B29C 64/124; B29C 64/135; B29K 2995/0088; B29K 2995/0094; B29K 2995/0073; B29K 2995/0087; B29K 2995/0089; B29K 2423/06; B29K 2105/16; B29K 2079/085
USPC .................. 522/2, 1, 6, 189, 184, 71; 520/1
See application file for complete search history.

(56) References Cited

U.S. PATENT DOCUMENTS

2024/0384088 A1* 11/2024 Nishiura ................ B33Y 70/00

FOREIGN PATENT DOCUMENTS

| JP | 07-026060 A | 1/1995 |
| JP | 2001-342204 A | 12/2001 |
| JP | 2004-352781 A | 12/2004 |
| JP | 2005-250438 A | 9/2005 |

(Continued)

OTHER PUBLICATIONS

Ichikawa et al, JP 2011079888 Machine Translation, Apr. 21, 2011 (Year: 2011).*

*Primary Examiner* — Jessica Whiteley
(74) *Attorney, Agent, or Firm* — Canon U.S.A., Inc. IP Division

(57) ABSTRACT

A photo-curable resin composition for three-dimensional shaping includes a polyfunctional radical polymerizable compound (A), a monofunctional radical polymerizable compound (B), polyethylene particles (C), and a curing agent (D). The polyfunctional radical polymerizable compound (A) is a single polyfunctional radical polymerizable compound having an ethylenically unsaturated group equivalent of 700 g/eq or more and 8,000 g/eq or less or a mixture including a plurality of types of polyfunctional radical polymerizable compounds and having an ethylenically unsaturated group equivalent of 700 g/eq or more and 8,000 g/eq or less, the ethylenically unsaturated group equivalent being a weighted average of ethylenically unsaturated group equivalents of the polyfunctional radical polymerizable compounds in terms of weight ratio. A content of the polyethylene particles (C) is 5 parts by mass or more and 50 parts by mass or less relative to 100 parts by mass of a total of the polyfunctional radical polymerizable compound (A) and the monofunctional radical polymerizable compound (B).

20 Claims, 1 Drawing Sheet

(56) References Cited

FOREIGN PATENT DOCUMENTS

JP        2011079888 A  *  4/2011
WO    2017/170465 A1    10/2017

* cited by examiner

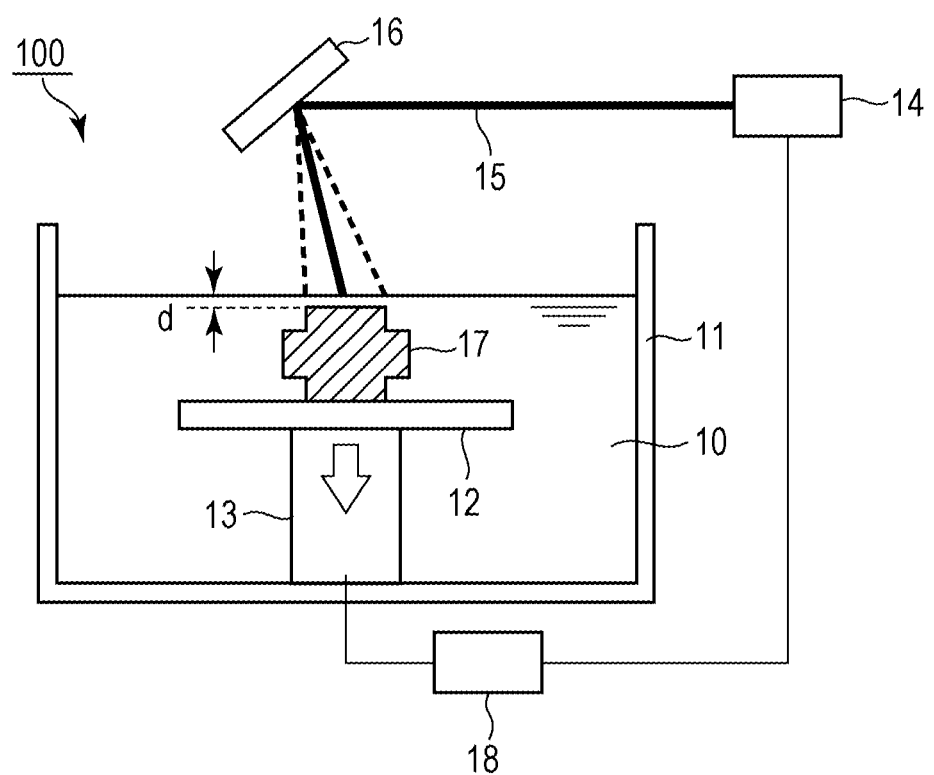

PHOTOCURABLE RESIN COMPOSITION FOR THREE-DIMENSIONAL MODELING AND METHOD FOR PRODUCING ARTICLE

CROSS-REFERENCE TO RELATED APPLICATIONS

This application is a National Stage filing of International Application No. PCT/JP2020/014137 filed Mar. 27, 2020, which claims the benefit of Japanese Patent Application No. 2019-075945 filed Apr. 11, 2019 and No. 2020-054575 filed Mar. 25, 2020, the disclosures of each of which are hereby incorporated by reference herein in their entirety.

TECHNICAL FIELD

The present invention relates to a photo-curable resin composition for three-dimensional shaping and a method for producing a three-dimensional article using the same.

BACKGROUND ART

As one example of the applications of liquid curable resin compositions, studies have been extensively performed on an optical three-dimensional shaping method (stereolithography), in which a curable resin composition is cured with light, such as ultraviolet rays, layer by layer, and the cured layers are sequentially stacked to produce a desired three-dimensional article. Since stereolithography can realize shaping at a higher accuracy than other methods, the applications of stereolithography have expanded to include not only the shaping of prototypes for checking the shapes (rapid prototyping) but also the shaping of working models and the shaping of molds for checking functionality (rapid tooling). Furthermore, the applications of stereolithography are expanding to include the shaping of actual products (rapid manufacturing).

Under such a background, requirements for curable resin compositions have been enhanced. For example, there has been a demand for curable resin compositions that enable the shaping of articles having sliding properties with a low coefficient of friction and high wear resistance and mechanical properties, such as high rigidity and toughness, comparable to those of general-purpose engineering plastics. Patent Literature 1 discloses a technology in which a polyolefin powder and potassium titanate fibers are added to a thermosetting resin to thereby provide excellent slidability and wear resistance while maintaining excellent mechanical strength exhibited by the thermosetting resin.

CITATION LIST

Patent Literature

PTL 1: Japanese Patent Laid-Open No. 08-231859

SUMMARY OF INVENTION

Technical Problem

Shaped articles used as actual products are desired to have not only high sliding properties but also moderate toughness. However, it is difficult to satisfy these physical properties at the same time.

In Patent Literature 1, although there is a description of mechanical strength, there is no disclosure regarding toughness. Furthermore, since the resin composition described in Patent Literature 1 includes a thermosetting resin as a main component, the resin composition cannot be used in stereolithography.

Solution to Problem

To solve the problems described above, an object of the present invention is to provide a photo-curable resin composition for three-dimensional shaping, the photo-curable resin composition enabling the shaping of an article having high toughness and sliding properties.

A photo-curable resin composition for three-dimensional shaping according to the present invention includes a polyfunctional radical polymerizable compound (A), a monofunctional radical polymerizable compound (B), polyethylene particles (C), and a curing agent (D), wherein the polyfunctional radical polymerizable compound (A) is a single polyfunctional radical polymerizable compound having an ethylenically unsaturated group equivalent of 700 g/eq or more and 8,000 g/eq or less or a mixture including a plurality of types of polyfunctional radical polymerizable compounds and having an ethylenically unsaturated group equivalent of 700 g/eq or more and 8,000 g/eq or less, the ethylenically unsaturated group equivalent being a weighted average of ethylenically unsaturated group equivalents of the polyfunctional radical polymerizable compounds in terms of weight ratio, and a content of the polyethylene particles (C) is 5 parts by mass or more and 50 parts by mass or less relative to 100 parts by mass of a total of the polyfunctional radical polymerizable compound (A) and the monofunctional radical polymerizable compound (B).

Advantageous Effects of Invention

The use of the photo-curable resin composition for three-dimensional shaping according to the present invention can provide a shaped article excellent in toughness and sliding properties.

BRIEF DESCRIPTION OF DRAWING

FIG. 1 is a view illustrating an example of the structure of a shaping apparatus in which a photo-curable resin composition according to the present invention is used.

DESCRIPTION OF EMBODIMENTS

Embodiments of the present invention will be described below. It should be noted that the embodiments described below are merely one embodiment of the present invention, and the present invention is not limited to these embodiments.

<Polyfunctional Radical Polymerizable Compound (A)>

A polyfunctional radical polymerizable compound (A) included in a photo-curable resin composition (may simply be referred to as a curable resin composition or a resin composition) for three-dimensional shaping according to the present invention is a compound having two or more radical polymerizable functional groups in its molecule. The radical polymerizable functional groups may be ethylenically unsaturated groups. Examples of the ethylenically unsaturated groups include a (meth)acryloyl group and a vinyl group. Examples of the polyfunctional radical polymerizable compound include (meth)acrylate-based compounds, vinyl ether group-containing (meth)acrylate-based compounds, (meth)acryloyl group-containing isocyanurate-based compounds, (meth)acrylamide-based compounds, urethane (meth)acrylate-based compounds, maleimide-based compounds, vinyl ether-based compounds, and aromatic vinyl-based compounds. Of these, from the viewpoints of the ease of availability and curability, (meth)acrylate-based compounds and urethane (meth)acrylate-based compounds are preferred.

Various compounds can be used as the polyfunctional radical polymerizable compound (A) of the present invention; however, polyfunctional radical polymerizable compounds having a urethane structure are particularly preferred because they are easily synthesized and easily available, and the resulting shaped articles have high toughness. Polyfunctional radical polymerizable compounds having a polyether structure are preferred because they have low viscosities, are smoothly dripped during shaping, and provide shaped articles with high accuracy. Polyfunctional radical polymerizable compounds having a polyester structure or a polycarbonate structure are preferred because they provide shaped articles having high toughness. The polyfunctional radical polymerizable compound (A) may be a single compound selected from these compounds or may contain two or more of these compounds. The polyfunctional radical polymerizable compound (A) in the present invention is a name that collectively indicates one or a plurality of types of polyfunctional radical polymerizable compounds included in the photo-curable resin composition.

In the present invention, if the value of a Charpy impact test measured in accordance with JIS K 7111 is $1.0 \text{ kJ/m}^2$ or more, the toughness is considered to be good. If the value of the Charpy impact test is $3.0 \text{ kJ/m}^2$ or more, the toughness is considered to be excellent. If a specimen has a toughness of less than $1.0 \text{ kJ/m}^2$ or if the test cannot be performed (for example, a specimen is broken when a notch is formed in the specimen), it is highly possible that the shaped article is broken when a support member is removed. In addition, the shaped article may be broken when the shaped article is fitted into another member or when the shaped article is subjected to secondary processing. Note that the support member is a portion formed in the shaping process in order to hold the desired shape and is generally removed after completion of the shaping.

Examples of the polyfunctional radical polymerizable compound (A) having a urethane structure include compounds obtained by a reaction between a hydroxy group-containing (meth)acrylate-based compound and a polyvalent isocyanate-based compound. Examples thereof further include compounds obtained by a reaction between a hydroxy group-containing (meth)acrylate-based compound, a polyvalent isocyanate-based compound, and a polyol-based compound. Of these, compounds obtained by causing a hydroxy group-containing (meth)acrylate-based compound, a polyvalent isocyanate-based compound, and a polyol-based compound to react with each other are particularly preferred because high toughness can be realized.

Examples of the hydroxy group-containing (meth)acrylate-based compound include hydroxyalkyl (meth)acrylates such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate, and 2-hydroxyethyl acryloyl phosphate, 2-(meth)acryloyloxyethyl-2-hydroxypropyl phthalate, caprolactone-modified 2-hydroxyethyl (meth)acrylate, dipropylene glycol (meth)acrylate, fatty acid-modified glycidyl (meth)acrylate, polyethylene glycol mono(meth)acrylate, polypropylene glycol mono(meth)acrylate, 2-hydroxy-3-(meth)acryloyloxypropyl (meth)acrylate, glycerin di(meth)acrylate, 2-hydroxy-3-acryloyl-oxypropyl methacrylate, pentaerythritol tri(meth)acrylate, caprolactone-modified pentaerythritol tri(meth)acrylate, ethylene oxide-modified pentaerythritol tri(meth)acrylate, dipentaerythritol penta(meth)acrylate, caprolactone-modified dipentaerythritol penta(meth)acrylate, and ethylene oxide-modified dipentaerythritol penta(meth)acrylate. These hydroxy group-containing (meth)acrylate-based compounds may be used alone or in combination of two or more thereof.

Examples of the polyvalent isocyanate-based compound include aromatic polyisocyanates such as tolylene diisocyanate, diphenylmethane diisocyanate, polyphenylmethane polyisocyanate, modified diphenylmethane diisocyanate, xylylene diisocyanate, tetramethylxylylene diisocyanate, phenylene diisocyanate, and naphthalene diisocyanate; aliphatic polyisocyanates such as pentamethylene diisocyanate, hexamethylene diisocyanate, trimethylhexamethylene diisocyanate, lysine diisocyanate, and lysine triisocyanate; alicyclic polyisocyanates such as hydrogenated diphenylmethane diisocyanate, hydrogenated xylylene diisocyanate, isophorone diisocyanate, norbornene diisocyanate, and 1,3-bis(isocyanatomethyl)cyclohexane; trimer compounds and multimer compounds of these polyisocyanates; allophanate polyisocyanates; biuret polyisocyanates; and water-dispersible polyisocyanates. These polyvalent isocyanate-based compounds may be used alone or in combination of two or more thereof.

Examples of the polyol-based compound include polyether-based polyols, polyester-based polyols, polycarbonate-based polyols, polyolefin-based polyols, polybutadiene-based polyols, (meth)acrylic-based polyols, and polysiloxane-based polyols. These polyol-based compounds may be used alone or in combination of two or more thereof.

Examples of polyether-based polyols include alkylene structure-containing polyether-based polyols such as polyethylene glycol, polypropylene glycol, polytetramethylene glycol, polybutylene glycol, and polyhexamethylene glycol; and random copolymers and block copolymers of these polyalkylene glycols.

Examples of polyester-based polyols include condensation polymers of polyhydric alcohols and polyvalent carboxylic acids, ring-opening polymers of cyclic esters (lactones), and reaction products of three components of a polyhydric alcohol, a polyvalent carboxylic acid, and a cyclic ester.

Examples of the polyhydric alcohols include ethylene glycol, diethylene glycol, propylene glycol, dipropylene glycol, trimethylene glycol, 1,4-tetramethylene diol, 1,3-tetramethylene diol, 2-methyl-1,3-trimethylene diol, 1,5-pentamethylene diol, neopentyl glycol, 1,6-hexamethylene diol, 3-methyl-1,5-pentamethylene diol, 2,4-diethyl-1,5-pentamethylene diol, glycerin, trimethylolpropane, trimethylolethane, cyclohexanediols (such as 1,4-cyclohexanediol), bisphenols (such as bisphenol A), and sugar alcohols (such as xylitol and sorbitol).

Examples of the polyvalent carboxylic acids include aliphatic dicarboxylic acids such as malonic acid, maleic acid, fumaric acid, succinic acid, glutaric acid, adipic acid, suberic acid, azelaic acid, sebacic acid, and dodecanedioic acid; alicyclic dicarboxylic acids such as 1,4-cyclohexane dicarboxylic acid; and aromatic dicarboxylic acids such as terephthalic acid, isophthalic acid, orthophthalic acid, 2,6-naphthalenedicarboxylic acid, paraphenylene dicarboxylic acid, and trimellitic acid.

Examples of the cyclic esters include propiolactone, β-methyl-δ-valerolactone, and ε-caprolactone.

Examples of polycarbonate-based polyols include reaction products of a polyhydric alcohol and phosgene, and ring-opening polymers of cyclic carbonic acid esters (such as alkylene carbonates).

Examples of the polyhydric alcohol include the polyhydric alcohols exemplified in the description of the polyester-based polyols. Examples of the alkylene carbonates include ethylene carbonate, trimethylene carbonate, tetramethylene carbonate, and hexamethylene carbonate.

The polycarbonate polyol may be any compound having a carbonate bond in its molecule and having a hydroxyl group at an end thereof and may have an ester bond together with the carbonate bond.

Examples of the polyfunctional radical polymerizable compound (A) having a polyether structure, a polyester structure, and a polycarbonate structure include compounds obtained by causing the polyether-based polyol, the polyester-based polyol, and the polycarbonate-based polyol to react with a (meth)acrylic acid chloride or a (meth)acrylic acid bromide.

In the present invention, the polyfunctional radical polymerizable compound (A) included in the photo-curable resin composition has an ethylenically unsaturated group equivalent of 700 g/eq or more and 8,000 g/eq or less. If the polyfunctional radical polymerizable compound (A) included in the photo-curable resin composition is a single compound, a polyfunctional radical polymerizable compound having an ethylenically unsaturated group equivalent of 700 g/eq or more and 8,000 g/eq or less is used. The term ethylenically unsaturated group equivalent as used herein is a value determined by dividing the weight-average molecular weight of the polyfunctional radical polymerizable compound by the number of ethylenically unsaturated groups in one molecule. As the ethylenically unsaturated group equivalent increases, the crosslinking density in the resin composition after photo-curing decreases, and a shaped article (article) having good toughness is obtained. If the photo-curable resin composition includes a plurality of types of polyfunctional radical polymerizable compounds, the weighted average value of the respective ethylenically unsaturated group equivalents of the polyfunctional radical polymerizable compounds in terms of weight ratio included in the photo-curable resin composition is defined as the ethylenically unsaturated group equivalent of the polyfunctional radical polymerizable compound (A). The plurality of types of polyfunctional radical polymerizable compounds are mixed such that the value becomes 700 g/eq or more and 8,000 g/eq or less and used.

As the ethylenically unsaturated group equivalent of the polyfunctional radical polymerizable compound (A) increases, a shaped article having better toughness is obtained; however, an ethylenically unsaturated group equivalent of more than 8,000 g/eq causes the following problems.

If the ethylenically unsaturated group equivalent of the polyfunctional radical polymerizable compound (A) is excessively large, the crosslinking density in the resin composition after photo-curing excessively decreases. As a result, heat resistance and the modulus of elasticity of the shaped article decrease, and shape stability of the shaped article decreases. For example, when a shaped article is subjected to heat treatment after shaping for the purpose of causing unreacted monomers to react, the shaped article is deformed. In addition, when force is applied to the shaped article, deformation tends to occur, which is not preferred in terms of shape stability of the shaped article.

On the other hand, if the ethylenically unsaturated group equivalent of the polyfunctional radical polymerizable compound (A) is less than 700 g/eq, the crosslinking density in the resin composition after photo-curing excessively increases. Consequently, the toughness of the shaped article decreases, and cracking occurs when parts are fitted to each other or when machining such as thread fastening is performed. Thus, the ethylenically unsaturated group equivalent of the polyfunctional radical polymerizable compound (A) is preferably 700 g/eq or more and 8,000 g/eq or less, and more preferably 700 g/eq or more and 4,000 g/eq or less from the viewpoint that the resulting shaped articles are excellent in toughness and shape stability.

Note that the weight-average molecular weight (Mw) of the polyfunctional radical polymerizable compound (A) of the present invention is a weight-average molecular weight in terms of the molecular weight of standard polystyrene. The weight-average molecular weight can be measured by high-performance liquid chromatography (high-performance GPC apparatus "HLC-8220GPC" manufactured by Tosoh Corporation) connected in series with two columns: Shodex GPCLF-804 (exclusion limit molecular weight: $2\times10^6$, fractionation range: 300 to $2\times10^6$).

The amount of the polyfunctional radical polymerizable compound (A) included in the photo-curable resin composition according to the present invention is preferably 20 parts by mass or more and 75 parts by mass or less relative to 100 parts by mass of the total of the polyfunctional radical polymerizable compound (A) and a monofunctional radical polymerizable compound (B) described later. If the content of the polyfunctional radical polymerizable compound (A) is less than 20 parts by mass, curability of the curable resin composition and toughness of the resulting shaped articles tend to decrease. On the other hand, if the content of the polyfunctional radical polymerizable compound (A) is more than 75 parts by mass, the viscosity of the curable resin composition tends to increase, and it becomes difficult to use the curable resin composition in the three-dimensional shaping method. Thus, the content of the polyfunctional radical polymerizable compound (A) included in the photo-curable resin composition for three-dimensional shaping is preferably 20 parts by mass or more and 75 parts by mass or less, and more preferably 30 parts by mass or more and 75 parts by mass or less relative to 100 parts by mass of the total of the polyfunctional radical polymerizable compound (A) and the monofunctional radical polymerizable compound (B).

<Monofunctional Radical Polymerizable Compound (B)>

The monofunctional radical polymerizable compound (B) included in the photo-curable resin composition according to the present invention is a compound having one radical polymerizable functional group in its molecule. Since the curable resin composition includes the monofunctional radical polymerizable compound (B), a viscosity suitable for three-dimensional shaping can be realized. Furthermore, an adjustment of the amount of monofunctional radical polymerizable compound (B) added or an appropriate selection of the type of monofunctional radical polymerizable compound (B) enables mechanical properties of shaped articles obtained by curing the curable resin composition to be adjusted to desired ranges.

Examples of the monofunctional radical polymerizable compound (B) include, but are not limited to, acrylamide-based compounds, (meth)acrylate-based compounds, maleimide-based compounds, styrene-based compounds, acrylonitrile-based compounds, vinyl ester-based compounds, N-vinyl-based compounds, e.g., N-vinylpyrrolidone, conjugated diene-based compounds, vinyl ketone-based compounds, and vinyl halide/vinylidene halide-based compounds. Of these, acrylamide-based compounds, (meth)acrylate-based compounds, maleimide-based monomers, and N-vinyl-based compounds are particularly preferred in view of excellent curability of the resin composition and excellent mechanical properties of the resulting shaped articles.

Examples of acrylamide-based compounds include (meth)acrylamide, N-methyl(meth)acrylamide, N-isopropyl (meth)acrylamide, N-tert-butyl(meth)acrylamide, N-phenyl (meth)acrylamide, N-methylol(meth)acrylamide, N,N-diacetone(meth)acrylamide, N,N-dimethyl(meth)acrylamide, N,N-diethyl(meth)acrylamide, N,N-dipropyl(meth)acrylamide, N,N-dibutyl(meth)acrylamide, N-(meth)acryloylmorpholine, N-(meth)acryloylpiperidine, N-[3-(dimethylamino) propyl]acrylamide, and N-tert-octyl(meth)acrylamide.

Examples of (meth)acrylate-based compounds include methyl (meth)acrylate, ethyl (meth)acrylate, n-butyl (meth)acrylate, isobutyl (meth)acrylate, t-butyl (meth)acrylate, 2-ethylhexyl (meth)acrylate, n-octyl (meth)acrylate, i-octyl (meth)acrylate, lauryl (meth)acrylate, stearyl (meth)acrylate, cyclohexyl (meth)acrylate, isobornyl (meth)acrylate, adamantyl (meth)acrylate, 3-hydroxy-1-adamantyl (meth) acrylate, 3,5-dihydroxy-1-adamantyl (meth)acrylate, 2-methyl-2-adamantyl (meth)acrylate, 2-ethyl-2-adamantyl (meth)acrylate, 2-isopropyl-2-adamantyl (meth)acrylate, 2-hydroxyethyl (meth)acrylate, 2-hydroxypropyl (meth) acrylate, 2-hydroxybutyl (meth)acrylate, 4-hydroxybutyl (meth)acrylate, glycidyl (meth)acrylate, 3-methyl-3-oxetanyl-methyl (meth)acrylate, tetrahydrofurfuryl (meth)acrylate, phenylglycidyl (meth)acrylate, dimethylaminomethyl (meth)acrylate, phenylcellosolve (meth)acrylate, dicyclopentenyl (meth)acrylate, dicyclopentenyloxyethyl (meth) acrylate, biphenyl (meth)acrylate, 2-hydroxyethyl (meth) acryloyl phosphate, phenyl (meth)acrylate, phenoxyethyl (meth)acrylate, phenoxypropyl (meth)acrylate, benzyl (meth)acrylate, butoxytriethylene glycol (meth)acrylate, 2-ethylhexyl polyethylene glycol (meth)acrylate, nonylphenyl polypropylene glycol (meth)acrylate, methoxydipropylene glycol (meth)acrylate, glycerol (meth)acrylate, trifluoromethyl (meth)acrylate, trifluoroethyl (meth)acrylate, tetrafluoropropyl (meth)acrylate, octafluoropentyl (meth) acrylate, polyethylene glycol (meth)acrylate, polypropylene glycol (meth)acrylate, allyl (meth)acrylate, 2,2,2-trifluoroethyl (meth)acrylate, 2,2,3,3-tetrafluoropropyl (meth)acrylate, 1H,1H,5H-octafluoropentyl (meth)acrylate, epichlorohydrin-modified butyl (meth)acrylate, epichlorohydrin-modified phenoxy (meth)acrylate, ethylene oxide (EO)-modified phthalic acid (meth)acrylate, EO-modified succinic acid (meth)acrylate, caprolactone-modified 2-hydroxyethyl (meth)acrylate, N,N-dimethylaminoethyl (meth) acrylate, N,N-diethylaminoethyl (meth)acrylate, morpholino(meth)acrylate, EO-modified phosphoric acid (meth) acrylate, allyloxy methyl acrylate (product name: AO-MA, manufactured by NIPPON SHOKUBAI CO., LTD.), (meth) acrylates having an imide group (product name: M-140, manufactured by TOAGOSEI CO., LTD.), and monofunctional (meth)acrylates having a siloxane structure.

Examples of maleimide-based monomers include maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

Examples of other monofunctional radical polymerizable compounds include styrene derivatives such as styrene, vinyltoluene, α-methylstyrene, chlorostyrene, styrenesulfonic acid, and salts thereof; vinyl esters such as vinyl acetate, vinyl propionate, vinyl pivalate, vinyl benzoate, and vinyl cinnamate; vinyl cyanide compounds such as (meth)acrylonitrile; and N-vinyl compounds such as N-vinylpyrrolidone, N-vinylcaprolactam, N-vinylimidazole, N-vinylmorpholine, and N-vinylacetamide.

These monofunctional radical polymerizable compounds may be used alone or in combination of two or more thereof.

The amount of the monofunctional radical polymerizable compound (B) included in the curable resin composition according to the present invention is preferably 25 parts by mass or more and 80 parts by mass or less relative to 100 parts by mass of the total of the polyfunctional radical polymerizable compound (A) and the monofunctional radical polymerizable compound (B). If the proportion of the monofunctional radical polymerizable compound (B) is less than 25 parts by mass, the viscosity of the curable resin composition tends to significantly increase, and it becomes difficult to use the curable resin composition in three-dimensional shaping. A proportion of the monofunctional radical polymerizable compound (B) of more than 80 parts by mass is not preferred because both curability of the curable resin composition and toughness of the resulting shaped articles tend to decrease. The amount of the monofunctional radical polymerizable compound (B) is more preferably 25 parts by mass or more and 70 parts by mass or less.

<Polyethylene Particles (C)>

Polyethylene particles (C) included in the curable resin composition according to the present invention have a viscosity-average molecular weight of 1,500,000 or more. Polyethylene having a higher viscosity-average molecular weight exhibits better wear resistance.

Thus, the addition of polyethylene particles having a sufficiently high molecular weight to the curable resin composition enables wear resistance to be improved while reducing the coefficient of friction of articles obtained by curing the resin composition. The polyethylene particles more preferably have a viscosity-average molecular weight of 1,500,000 or more because high wear resistance that is sufficient for practical use is obtained. Polyethylene particles having a viscosity-average molecular weight of 1,800,000 or more are more preferred in view of ease of availability. In the present invention, the viscosity-average molecular weight was calculated by determining the limiting viscosity by the method described in Japanese Patent Laid-Open No. 2013-170231.

The polyethylene particles (C) included in the curable resin composition according to the present invention preferably have an average particle diameter of 50 μm or less. If the average particle diameter is more than 50 μm, the distribution of the polyethylene particles in a layer may be uneven because, in stereolithography, layers are often stacked in layer thickness units of 200 μm or less. On the other hand, if the average particle diameter of the polyethylene particles (C) is excessively small, the viscosity of the curable resin composition significantly increases; thus the average particle diameter is preferably 1 μm or more. That is, the average particle diameter of the polyethylene particles (C) is preferably 1 μm or more and 50 μm or less. The average particle diameter is more preferably 10 μm or more and 30 μm or less in view of ease of availability. In addition, the polyethylene particles (C) are preferably spherical in view of ease of dispersion in the curable resin composition.

Herein, the average particle diameter of the polyethylene particles (C) refers to an arithmetical mean value of the equivalent spherical diameter measured by the Coulter counter method. The specific measurement principle of the Coulter counter method is as follows.

A container containing an electrolyte solution in which particles are dispersed is partitioned into two spaces by a wall having a single through-pore. Electrodes are disposed with the wall interposed therebetween, and a constant current is allowed to flow between the electrodes. Upon suction of the electrolyte solution at a constant suction force on one side partitioned by the wall, a particle passes through the pore together with the electrolyte solution. At this time, the electrolyte solution in the pore is decreased by an amount corresponding to the volume of the particle, and the electrical resistance of the pore is increased in proportion to the amount of decrease in the electrolyte solution. Since the current flowing through the pore is constant, the voltage between the electrodes is changed in proportion to the amount of change in the electrical resistance of the pore. The volume of the particle is measured from this amount of change in the voltage, the equivalent spherical diameter of the particle is determined from this volume, and the particle diameter distribution can be obtained.

A specific measurement method is as follows. First, 2 mL of a sodium alkylbenzene sulfonate was mixed with 5 mg of polyethylene particles, and the mixture was added to 100 mL of an ISOTON-II electrolyte solution manufactured by Beckman Coulter, Inc. Subsequently, dispersion treatment was performed with an ultrasonic disperser for about five minutes to prepare a sample. A Multisizer 3 manufactured by Beckman Coulter, Inc. was used as a measurement apparatus for the Coulter counter method, and a 200-μm aperture or a 400-μm aperture was used. The equivalent spherical diameter and the number of polyethylene particles were measured with the apparatus, and the arithmetical mean value of the equivalent spherical diameter was determined from the results.

The polyethylene particles (C) used in the present invention may have surfaces subjected to chemical treatment for the purpose of, for example, improving dispersibility in the curable resin composition, improving dispersion stability, and preventing aggregation. Examples of the chemical treatment include plasma treatment in air, flame treatment, UV treatment, ozone treatment, and treatment by a hydrogen abstraction reaction of a peroxide. The surfaces after the treatment may be subjected to graft treatment with a low-molecular weight or high-molecular weight compound. Alternatively, the surfaces of the polyethylene particles may be coated with a low-molecular weight or high-molecular weight compound.

The polyethylene particles (C) included in the curable resin composition may be a single type of particles or may include a plurality of types of particles made of a plurality of materials different from each other.

The amount of polyethylene particles (C) included in the curable resin composition is preferably 5 parts by mass or more and 50 parts by mass or less relative to 100 parts by mass of the total of the polyfunctional radical polymerizable compound (A) and the monofunctional radical polymerizable compound (B). When the content of the polyethylene particles (C) is within this range, a viscosity applicable to the three-dimensional shaping method is obtained, and wear resistance of shaped articles obtained by curing the resin composition is also enhanced.

<Curing Agent (D)>

As a curing agent (D), a photo-radical polymerization initiator is more preferably used. The curable resin composition may include a thermal radical polymerization initiator in addition to a photo-radical polymerization initiator. When the curable resin composition includes a thermal radical polymerization initiator, mechanical properties of shaped articles can be further enhanced by performing heat treatment after shaping by light irradiation.

[Photo-Radical Polymerization Initiator]

Photo-radical polymerization initiators are mainly classified into intramolecular cleavage-type photo-radical polymerization initiators and hydrogen abstraction-type photo-radical polymerization initiators. In the intramolecular cleavage-type photo-radical polymerization initiators, a bond at a specific site is broken by absorption of light having a specific wavelength, radicals are generated in the broken site, and the radicals serve as a polymerization initiator to initiate the polymerization of the polyfunctional radical polymerizable compound (A) and the monofunctional radical polymerizable compound (B). In the hydrogen abstraction-type photo-radical polymerization initiators, a polymerization initiator is excited by absorbing light having a specific wavelength, and the resulting excited species causes a hydrogen abstraction reaction from a hydrogen donor present in the surroundings to generate radicals. The generated radicals serve as a polymerization initiator to initiate the polymerization of the polyfunctional radical polymerizable compound (A) and the monofunctional radical polymerizable compound (B).

Known intramolecular cleavage-type photo-radical polymerization initiators include alkylphenone-based photo-radical polymerization initiators, acylphosphine oxide-based photo-radical polymerization initiators, and oxime ester-based photo-radical polymerization initiators. These are a type of photo-radical polymerization initiators in which a bond adjacent to a carbonyl group is subjected to α-cleavage to generate radical species. Examples of alkylphenone-based photo-radical polymerization initiators include benzyl methyl ketal-based photo-radical polymerization initiators, α-hydroxyalkylphenone-based photo-radical polymerization initiators, and aminoalkylphenone-based photo-radical polymerization initiators. Examples of specific compounds include, but are not limited to, the following. Examples of benzyl methyl ketal-based photo-radical polymerization initiators include 2,2-dimethoxy-1,2-diphenylethan-1-one (Irgacure® 651, manufactured by BASF); examples of α-hydroxyalkylphenone-based photo-radical polymerization initiators include 2-hydroxy-2-methyl-1-phenylpropan-1-one (Darocur® 1173, manufactured by BASF), 1-hydroxycyclohexyl phenyl ketone (Irgacure® 184, manufactured by BASF), 1-[4-(2-hydroxyethoxy)phenyl]-2-hydroxy-2-methyl-1-propan-1-one (Irgacure® 2959, manufactured by BASF), and 2-hydroxy-1-{4-[4-(2-hydroxy-2-methylpropionyl)benzyl]phenyl}-2-methylpropan-1-one (Irgacure® 127, manufactured by BASF); and examples of aminoalkylphenone-based photo-radical polymerization initiators include 2-methyl-1-(4-(methylthiophenyl)-2-morpholinopropan-1-one (Irgacure® 907, manufactured by BASF) and 2-benzylmethyl-2-dimethylamino-1-(4-morpholinophenyl)-1-butanone (Irgacure® 369, manufactured by BASF). Examples of acylphosphine oxide-based photo-radical polymerization initiators include, but are not limited to, 2,4,6-trimethylbenzoyldiphenylphosphine oxide (Lucirin® TPO, manufactured by BASF) and bis(2,4,6-trimethylbenzoyl)-phenylphosphine oxide (Irgacure® 819, manufactured by BASF). Examples of oxime ester-based photo-radical polymerization initiators include, but are not limited to, (2E)-2-(benzoyloxyimino)-1-[4-(phenylthio)phenyl]octan-1-one (Irgacure® OXE-01, manufactured by BASF).

Examples of hydrogen abstraction-type photo-radical polymerization initiators include, but are not limited to, anthraquinone derivatives such as 2-ethyl-9,10-anthraquinone and 2-t-butyl-9,10-anthraquinone; and thioxanthone derivatives such as isopropylthioxanthone and 2,4-diethylthioxanthone.

In the present invention, two or more photo-radical polymerization initiators may be used in combination, or a photo-radical polymerization initiator may be used alone. To promote polymerization reaction by heat treatment after shaping, a thermal radical polymerization initiator may be included.

The amount of photo-radical polymerization initiator included in the curable resin composition is preferably 0.1 parts by mass or more and 15 parts by mass or less relative to 100 parts by mass of the total of the polyfunctional radical polymerizable compound (A) and the monofunctional radical polymerizable compound (B). The amount of photo-radical polymerization initiator is more preferably 0.1 parts by mass or more and 10 parts by mass or less. If the amount of photo-radical polymerization initiator is small, polymerization tends to become insufficient. If the amount of photo-radical polymerization initiator is large, transmission of light decreases, and polymerization tends to become uneven.

[Thermal Radical Polymerization Initiator]

The thermal radical polymerization initiator is not particularly limited as long as the initiator generates radicals as a result of heating, and existing known compounds can be used. Preferred examples thereof include azo-based compounds, peroxides, and persulfates. Examples of azo-based compounds include 2,2'-azobisisobutyronitrile, 2,2'-azobis (methyl isobutyrate), 2,2'-azobis-2,4-dimethylvaleronitrile, and 1,1'-azobis(1-acetoxy-1-phenylethane). Examples of peroxides include benzoyl peroxide, di-t-butyl benzoyl peroxide, t-butyl peroxypivalate, and di(4-t-butylcyclohexyl) peroxydicarbonate. Examples of persulfates include ammonium persulfate, sodium persulfate, and potassium persulfate.

The amount of thermal radical polymerization initiator added is preferably 0.1 parts by mass or more and 15 parts by mass or less, more preferably 0.1 parts by mass or more and 10 parts by mass or less relative to 100 parts by mass of the total of the polyfunctional radical polymerizable compound (A) and the monofunctional radical polymerizable compound (B). If the thermal radical polymerization initiator is added in an excessive amount, the molecular weight does not increase, and physical properties may be deteriorated.

<Other Components>

The curable resin composition according to the present invention may include various additives as other optional components as long as the object and advantages of the present invention are not impaired. Examples of additives include resins such as epoxy resins, polyurethane, polybutadiene, polychloroprene, polyester, styrene-butadiene block copolymers, polysiloxane, petroleum resins, xylene resins, ketone resins, and cellulose resins; engineering plastics such as polycarbonate, modified polyphenylene ether, polyamide, polyacetal, polyethylene terephthalate, polybutylene terephthalate, polyphenylsulfone, polysulfone, polyarylate, polyether imide, polyether ether ketone, polyphenylene sulfide, polyethersulfone, polyamide-imide, liquid crystal polymers, polytetrafluoroethylene, polychlorotrifluoroethylene, and polyvinylidene fluoride; reactive monomers such as fluorine-based oligomers, silicone-based oligomers, polysulfide-based oligomers, fluorine-containing monomers, and siloxane structure-containing monomers; soft metals such as gold, silver, and lead; layered crystal structure substances such as graphite, molybdenum disulfide, tungsten disulfide, boron nitride, graphite fluoride, calcium fluoride, barium fluoride, lithium fluoride, silicon nitride, and molybdenum selenide; polymerization inhibitors such as phenothiazine and 2,6-di-t-butyl-4-methylphenol; photosensitizers such as benzoin compounds, acetophenone compounds, anthraquinone compounds, thioxanthone compounds, ketal compounds, benzophenone compounds, tertiary amine compounds, and xanthone compounds; polymerization initiation aids; leveling agents; wettability improvers; surfactants; plasticizers; ultraviolet absorbers; silane coupling agents; inorganic fillers; pigments; dyes; antioxidants; flame retardants; thickeners; and antifoaming agents.

<Curable Resin Composition>

The curable resin composition according to the present invention is produced by adding, to the polyfunctional radical polymerizable compound (A), the monofunctional radical polymerizable compound (B), the polyethylene particles (C), and the curing agent (D), all of which are essential components, an appropriate amount of other optional components, as necessary. Specifically, the curable resin composition can be produced by charging these components in a stirring vessel, and stirring the components usually at 30° C. or higher and 120° C. or lower, preferably 50° C. or higher and 100° C. or lower. In such a case, the stirring time is usually one minute or more and six hours or less, and preferably 10 minutes or more and two hours or less. The total content of the polyfunctional radical polymerizable compound (A), the monofunctional radical polymerizable compound (B), and the polyethylene particles (C) is preferably 25 parts by mass or more and 100 parts by mass or less relative to 100 parts by mass of the curable resin composition excluding the curing agent (D). The total content is more preferably 75 parts by mass or more and 100 parts by mass or less. In the 100 parts by mass of the curable resin composition, the remaining number of parts by mass excluding the total of the polyfunctional radical polymerizable compound (A), the monofunctional radical polymerizable compound (B), and the polyethylene particles (C) is occupied by the curing agent (D) and the other components described above.

The viscosity of the curable resin composition according to the present invention is preferably 50 mPa·s or more and 30,000 mPa·s or less, and more preferably 50 mPa·s or more and 10,000 mPa·s or less, at 25° C.

The curable resin composition according to the present invention obtained as described above is suitably used as a shaping material for stereolithography. Specifically, the curable resin composition according to the present invention is irradiated with a light energy ray in accordance with slice data generated from three-dimensional shape data of an article to be shaped (shaping model) to supply energy necessary for curing. Thus, a shaped article having a desired shape can be produced.

<Cured Product>

A resin cured product according to the present invention can be obtained by curing the above-described curable resin composition by irradiation with a light energy ray. Examples of the light energy ray include ultraviolet rays and infrared rays. Of these, light rays having a wavelength of 300 nm or more and 450 nm or less can be preferably used because such light rays are easily available and the energy is easily absorbed by a photo-radical polymerization initiator. As a light source of the light energy ray, an ultraviolet or infrared laser (for example, an Ar laser or a He—Cd laser), a mercury lamp, a xenon lamp, a halogen lamp, a fluorescent lamp, or the like can be used. Of these, laser light sources are preferably used because the shaping time can be shortened by raising the energy level, and a high shaping accuracy can be achieved by reducing the irradiation diameter because laser light sources have excellent light-condensing properties. The light energy ray can be appropriately selected in accordance with the type of radical polymerization initiator included in the curable resin composition and can be used in combination of two or more.

<Function of Curable Resin Composition>

The curable resin composition according to the present invention can realize an article having good toughness and shape stability because the ethylenically unsaturated group equivalent of the polyfunctional radical polymerizable compound (A) is 700 g/eq or more and 8,000 g/eq or less.

Moreover, an article obtained from the curable resin composition according to the present invention has a low coefficient of friction and high wear resistance because the article includes polyethylene particles (C) having a viscosity-average molecular weight of 1,500,000 or more. Furthermore, the water absorption percentage of the whole cured product can be reduced because the polyethylene particles (C) have a very low water absorbency.

<Method for Producing Shaped Article>

The curable resin composition according to the present invention can be suitably used for shaping by stereolithography because the curable resin composition includes, as the curing agent (D), a photopolymerization initiator such as a photo-radical polymerization initiator. A shaped article made of the curable resin composition can be produced by publicly known stereolithography. A typical example of preferred stereolithography is a method including a step of sequentially curing a photo-curable resin composition in the form of a layer on the basis of slice data generated from three-dimensional data of an article to be shaped and is broadly divided into two methods, namely, a free surface method and a constrained surface method.

FIG. 1 illustrates an example of the structure of an optical shaping apparatus 100 using the free surface method. The optical shaping apparatus 100 includes a tank 11 filled with a liquid photo-curable resin composition 10. A shaping stage 12 is provided inside the tank 11 such that the shaping stage 12 can be driven by a drive shaft 13 in the vertical direction. A light energy ray 15 for curing the photo-curable resin composition 10, the light energy ray 15 being emitted from a light source 14, scans a surface of the tank 11 while the irradiation position of the light energy ray 15 is changed by a galvanometer mirror 16 controlled by a controller 18 in accordance with slice data. In the FIGURE, the scanning range is indicated by the thick broken lines.

A thickness d of the liquid photo-curable resin composition 10 cured by the light energy ray 15 is a value determined based on settings at the time of the generation of the slice data, and affects the accuracy of the resulting shaped article (the reproducibility of three-dimensional shape data of the article to be shaped). The thickness d is achieved by controlling a driving amount of the drive shaft 13 with the controller 18.

First, the controller 18 controls the drive shaft 13 on the basis of settings, so that the photo-curable resin composition is supplied on the stage 12 to have a thickness d. The liquid curable resin composition on the stage 12 is selectively irradiated with the light energy ray on the basis of the slice data so as to obtain a cured resin layer having a desired pattern, and the cured resin layer is thereby formed. Subsequently, the stage 12 is moved in the direction of the hollow arrow, and an uncured curable resin composition is thereby supplied on the surface of the cured resin layer to have a thickness d. The light energy ray 15 is then applied on the basis of the slice data to form a cured product integrated with the previously formed cured resin layer. A desired three-dimensional shaped article can be obtained by repeating this step of curing the curable resin composition in the form of a layer.

The three-dimensional shaped article obtained in this manner is taken out from the tank 11, an unreacted curable resin composition remaining on the surface thereof is removed, and washing is then performed as necessary. As a washing agent, alcohol-based organic solvents typified by alcohols such as isopropyl alcohol and ethyl alcohol can be used. In addition to the above, ketone-based organic solvents typified by acetone, ethyl acetate, and methyl ethyl ketone and aliphatic organic solvents typified by terpenes may be used. After washing with the washing agent, post-curing may be optionally performed by radiating light or heat. The post-curing can not only cure the unreacted curable resin composition that may remain on the surface and in the inside of the three-dimensional shaped article and reduce the stickiness of the surface of the three-dimensional shaped article, but also improve the initial strength of the three-dimensional shaped article.

Examples of the light energy ray used in the production include ultraviolet rays, electron beams, X-rays, and radiation. Of these, ultraviolet rays having a wavelength of 300 nm or more and 450 nm or less are preferably used from an economic viewpoint. The light source that generates ultraviolet rays may be, for example, an ultraviolet laser (such as an Ar laser or a He—Cd laser), a mercury lamp, a xenon lamp, a halogen lamp, or a fluorescent lamp. Of these, laser light sources are preferably used because they have excellent light-condensing properties, the shaping time can be shortened by raising the energy level, and a high shaping accuracy can be achieved.

When a surface formed by the curable resin composition is irradiated with an active energy ray to form a cured resin layer with a predetermined shape pattern, the resin can be cured by a point drawing mode or a line drawing mode using a light energy ray converged into a point or line shape. Alternatively, the resin may be cured by being irradiated with an active energy ray in a planar manner through a planar drawing mask formed by arranging a plurality of micro-optical shutters, such as liquid crystal shutters or digital micro-mirror shutters.

Similarly, shaping by the constrained surface method is also preferred. An optical shaping apparatus that employs the constrained surface method has a configuration in which the stage 12 of the optical shaping apparatus 100 in FIG. 1 is provided so as to pull a shaped article above the liquid level and light irradiation means is disposed below the tank 11. A typical shaping example by the constrained surface method is as follows. First, an apparatus is installed such that the distance between a support surface (shaping surface) of a support stage provided so as to be able to move upward and downward and a bottom surface of a tank containing a curable resin composition is a predetermined distance, and the curable resin composition is supplied between the support surface of the support stage and the bottom surface of the tank, that is, on the shaping surface. Subsequently, the curable resin composition supplied between the stage support surface and the bottom surface of the tank and having a predetermined thickness d is selectively irradiated with light from the bottom surface side of the tank containing the curable resin composition in accordance with slice data by using a laser light source or a projector. The curable resin composition between the stage support surface and the bottom surface of the tank is cured by irradiation with light to form a solid cured resin layer. The support stage is then lifted to detach the cured resin layer from the bottom surface of the tank.

The height of the support stage is then adjusted such that the distance between the surface (shaping surface) of the cured resin layer formed on the support stage and the bottom surface of the tank is the predetermined distance. Subsequently, selective light irradiation is similarly performed as described above to form, between the cured resin layer and the bottom surface of the tank, that is, on the shaping surface, a new cured resin layer integrated with the previously formed cured resin layer. Subsequently, this step is repeated a predetermined number of times while changing the pattern irradiated with light or without changing the pattern, to thereby form a three-dimensional shaped article in which a plurality of cured resin layers are integrally stacked on top of one another.

<Applications>

Applications of the curable resin composition according to the present invention and articles which are cured products of the curable resin composition are not particularly limited. The curable resin composition and the articles can be used in various applications, such as resins for stereolithography 3D printers, sporting goods, medical supplies and nursing care goods, custom-made articles such as prosthetic limbs, dentures, and artificial bones, industrial machinery and equipment, precision instruments, electric and electronic equipment, electric and electronic components, and building materials.

EXAMPLES

The present invention will be described in detail below with reference to Examples; however, the present invention is not limited to the Examples.

Example 1

A curable resin composition was prepared by blending components in accordance with the formulation described below, and stirring the resulting mixture under heating at 75° C. for two hours with a stirring device. Table 1 shows the resin composition and contents of the prepared curable resin composition together with other Examples.

[Polyfunctional Radical Polymerizable Compound (A)]
"KAYARAD UX6101" Manufactured by Nippon Kayaku Co., Ltd. 55 Parts by Mass KAYARAD UX6101 is a urethane acrylate having a weight-average molecular weight of 6,500 and having, as radical polymerizable substituents, two acryloyl groups in one molecule and has an ethylenically unsaturated group equivalent of 3,250 g/eq.

[Monofunctional Radical Polymerizable Compound (B)]
Isobornyl Methacrylate 45 Parts by Mass Isobornyl methacrylate is a methacrylic acid ester having a structure shown below.

[Chem. 1]

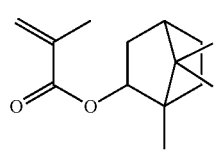

[Polyethylene Particles (C)]
"MIPELON XM-221U" Manufactured by Mitsui Chemicals, Inc. 25 Parts by Mass MIPELON XM-221U is in the form of spherical particles having a viscosity-average molecular weight of 2,000,000 and has an arithmetical mean value of the equivalent spherical diameter of 25 μm as measured by the Coulter counter method.

[Curing Agent (D)]
Omnirad 184 (Photo-Radical Polymerization Initiator Manufactured by IGM Resins, 1-Hydroxycyclohexyl Phenyl Ketone) 2 Parts by Mass

[Preparation of Specimen X]

A specimen was prepared from the obtained photo-curable resin composition by the following method. First, a metal mold having a length of 80 mm, a width of 10 mm, and a thickness of 4 mm or a silicon mold having a length of 30 mm, a width of 30 mm, and a thickness of 4 mm was interposed between two quartz glass plates and the curable resin composition was poured into the mold. The poured curable resin composition was irradiated, using an ultraviolet irradiation device (trade name: "LIGHT SOURCE EXECURE 3000" manufactured by HOYA CANDEO OPTRONICS), with ultraviolet rays at 5 mW/cm² from both surfaces of the metal mold for 360 seconds for each surface to obtain a cured product. The total irradiation energy for curing the photo-curable resin composition was 3,600 mJ/cm². The obtained cured product was placed in a heating oven at 50° C. and heat-treated for one hour and placed in a heating oven at 100° C. and heat-treated for two hours to obtain a specimen X having a length of 80 mm, a width of 10 mm, and a thickness of 4 mm. The specimen X was used for a Charpy impact test described later. The results are shown in Table 2.

[Preparation of Specimen Y]

Shaping was performed by using the obtained curable resin composition with a 3D printer (DWS-020X, manufactured by DWS, optical shaping apparatus for the constrained surface method) in accordance with slice data based on a three-dimensional shape of a rectangular parallelepiped with dimensions of 30 mm×30 mm×4 mm. A shaped article was prepared by stacking cured resin layers each having dimensions of 30 mm×4 mm×50 μm in thickness until the height reached 30 mm. The obtained shaped article was irradiated with ultraviolet light using a UV Curing Unit M (manufactured by DWS) for 30 minutes. The shaped article was then placed in a heating oven at 50° C. and heat-treated for one hour and placed in a heating oven at 100° C. and further heat-treated for two hours to obtain a specimen Y. The specimen Y was used for evaluation of shape formability, a coefficient of friction, and wear resistance described later. The results are shown in Table 2.

[Evaluation]
(Shape Formability)

The results of shape formability were evaluated in terms of dimensional error of the above-described specimen Y with respect to the shape of 30 mm×30 mm×4 mm. The evaluation criteria are as follows. If the evaluation criterion B is satisfied, it is determined that good shape formability is obtained. If the evaluation criterion A is satisfied, it is determined that excellent shape formability is obtained.

A: The dimensional error is within ±3%.
B: The dimensional error is larger than ±3%.
C: Shaping cannot be performed.

Note that the dimension of each side was measured after shaping with the 3D printer and before the heat treatment at 100° C.

(Charpy Impact Test)

A cutout (notch) with a depth of 2 mm and an angle of 45° was formed in a central portion of the specimen A in accordance with JIS K 7111 with a cutout-forming device (trade name "Notching Tool A-4" manufactured by Toyo Seiki Seisaku-sho, Ltd.). The specimen is fractured with an impact tester (trade name "IMPACT TESTER IT" manufactured by Toyo Seiki Seisaku-sho, Ltd.) from the back of the cutout of the specimen at an energy of 2 J. The energy required for fracture was calculated from an angle to which a hammer that was swung up to 150° swung upward after fracturing the specimen. The energy was defined as Charpy impact strength and used as an index of toughness. Note that if the specimen X was fractured during the formation of the notch, the Charpy impact strength was determined to be 0.0 KJ/m$^2$. The evaluation criteria of toughness are described below. If the evaluation criterion B is satisfied, it is determined that good toughness is obtained. If the evaluation criterion A is satisfied, it is determined that excellent toughness is obtained.

A: 3.0 kJ/m$^2$ or more
B: 1.0 kJ/m$^2$ or more and less than 3.0 kJ/m$^2$
C: less than 1.0 kJ/m$^2$ (Specific Wear Rate and Coefficient of Friction)

A specific wear rate and a coefficient of friction were measured in accordance with the JIS K 7218 A method under the conditions described below.

Measuring machine: Friction and wear tester MODEL EMF-III-F, manufactured by A & D Company, Limited
Test atmosphere: 23° C.±2° C., humidity 50% RH±5% RH
Specimen: Specimen Y (size 30 mm×30 mm, thickness 4 mm)
Counterpart: made of S45C, ring shape, surface roughness about 0.8 μm Ra, contact area 2 cm$^2$, load: 50 N
Sliding speed: 50 cm/s
Test time: 100 minutes
Sliding distance: 3 Km The counterpart was pressed against the specimen Y at the above load and slid at the above speed. One hundred minutes later, sliding was stopped, and the weight of wear was measured from the weights of the specimen Y before and after sliding. The volume of wear was calculated from the measured weight of wear and the specific gravity of the specimen Y. A value determined by dividing the calculated volume of wear by the sliding distance and the load was defined as the specific wear rate (unit: mm$^3 \cdot$N$^{-1} \cdot$Km$^{-1}$) and used as an index of wear resistance. The evaluation criteria of wear resistance are described below. If the evaluation criterion B is satisfied, it is determined that good wear resistance is obtained. If the evaluation criterion A is satisfied, it is determined that excellent wear resistance is obtained.

A: less than 0.1 mm$^3 \cdot$N$^{-1} \cdot$Km$^{-1}$
B: 0.1 mm$^3 \cdot$N$^{-1} \cdot$Km$^{-1}$ or more and less than 0.5 mm$^3 \cdot$N$^{-1} \cdot$Km$^{-1}$
C: 0.5 mm$^3 \cdot$N$^{-1} \cdot$Km$^{-1}$ or more The coefficient of friction was a value determined by dividing, by the load, the average of the friction force within 10 seconds before and after the time at which 60 minutes elapsed after the start of sliding. The evaluation criteria of the coefficient of friction are described below. If the evaluation criterion B is satisfied, it is determined that a good coefficient of friction is obtained. If the evaluation criterion A is satisfied, it is determined that an excellent coefficient of friction is obtained.

A: less than 0.3
B: 0.3 or more and less than 0.7
C: 0.7 or more

Examples 2 to 6 and Comparative Examples 1 to 4

Curable resin compositions were prepared as in Example 1 except that the contents of the components (A), (B), and (D) and the type or content of the polyethylene particles included in the curable resin compositions were changed as shown in Table 1 and evaluated as in Example 1. The results are summarized in Table 2. The contents of the polyfunctional radical polymerizable compound and the monofunctional radical polymerizable compound described in the table are the content of the polyfunctional radical polymerizable compound relative to 100 parts by mass of the total of the polyfunctional radical polymerizable compound and the monofunctional radical polymerizable compound, the content being expressed in units of parts by mass. The amount of the polyethylene particles (C) added is a content of the polyethylene particles (C) relative to 100 parts by mass of the total of the polyfunctional radical polymerizable compound (A) and the monofunctional radical polymerizable compound (B), the content being expressed in units of parts by mass.

The types of polyethylene particles (C) used are as follows.

[Polyethylene Particles (C)]

"MIPELON PM-200" Manufactured by Mitsui Chemicals, Inc.

MIPELON PM-200 is in the form of spherical particles having a viscosity-average molecular weight of 1,800,000 and has an arithmetical mean value of the equivalent spherical diameter of 10 μm as measured by the Coulter counter method.

"MIPELON XM-220" Manufactured by Mitsui Chemicals, Inc.

MIPELON XM-220 is in the form of spherical particles having a viscosity-average molecular weight of 2,000,000 and has an arithmetical mean value of the equivalent spherical diameter of 30 μm as measured by the Coulter counter method.

"FLO-THENE UF20S" Manufactured by Sumitomo Seika Chemicals Company, Limited.

FLO-THENE UF20S has a viscosity-average molecular weight of 150,000 and an arithmetical mean value of the equivalent spherical diameter of 30 μm as measured by the Coulter counter method.

"HI-ZEX MILLION 240M" Manufactured by Mitsui Chemicals, Inc.

HI-ZEX MILLION 240M has a viscosity-average molecular weight of 2,400,000 and has an arithmetical mean value of the equivalent spherical diameter of 160 μm as measured by the Coulter counter method.

Examples 7 to 15 and Comparative Examples 5 to 6

Curable resin compositions were prepared as in Example 1 except that the types or contents of the components (A), (B), and (D) and the content of the polyethylene particles included in the curable resin compositions were changed as shown in Table 3 and evaluated as in Example 1. Examples 11 to 15 and Comparative Examples 5 to 6 are examples in which a plurality of types of polyfunctional radical polymerizable compounds are included as the polyfunctional radical polymerizable compound (A). Examples 11 to 15 each include a mixture of a polyfunctional radical polymerizable compound having an ethylenically unsaturated group equivalent of 700 g/eq or more and 8,000 g/eq or less and at least one polyfunctional radical polymerizable compound having an ethylenically unsaturated group equivalent of less than 700 g/eq. The mixing ratio is adjusted such that the ethylenically unsaturated group equivalent of the polyfunctional radical polymerizable compound (A) is 700 g/eq or more and 8,000 g/eq or less. In contrast, in Comparative Examples 5 to 6, the mixing ratio is adjusted such that the ethylenically unsaturated group equivalent of the polyfunctional radical polymerizable compound (A) is less than 700 g. The results are summarized in Table 4.

The types of components used are as follows.
[Polyfunctional Radical Polymerizable Compound (A)]
"SHIKOH UV-7550B" Manufactured by the Nippon Synthetic Chemical Industry Co., Ltd.

SHIKOH UV-7550B is a urethane acrylate having a weight-average molecular weight of 2,400 and having, as radical polymerizable substituents, three acryloyl groups in one molecule and has an ethylenically unsaturated group equivalent of 700 g/eq.
"SHIKOH UV-3550AC" Manufactured by the Nippon Synthetic Chemical Industry Co., Ltd.

SHIKOH UV-3550AC is a mixture of 70 parts by mass of a urethane acrylate and 30 parts of ACMO, which is a monofunctional radical polymerizable compound (B). The weight-average molecular weight of the urethane acrylate is 14,000, two acryloyl groups are included as radical polymerizable substituents in one molecule, and the ethylenically unsaturated group equivalent is 7,000 g/eq.

In the resin composition in Table 3, the urethane acrylate component is expressed in terms of parts by mass of the polyfunctional radical polymerizable compound (A), and ACMO is expressed in terms of parts by mass of the monofunctional radical polymerizable compound (B).
"SHIKOH UV-6630B" Manufactured by the Nippon Synthetic Chemical Industry Co., Ltd.

SHIKOH UV-6630B is a urethane acrylate having a weight-average molecular weight of 3,000 and having, as radical polymerizable substituents, two acryloyl groups in one molecule and has an ethylenically unsaturated group equivalent of 1,500 g/eq.
"EBECRYL 8210" Manufactured by DAICEL-ALLNEX LTD.

EBECRYL 8210 is a urethane acrylate having a weight-average molecular weight of 600 and having, as radical polymerizable substituents, four acryloyl groups in one molecule and has an ethylenically unsaturated group equivalent of 150 g/eq.
"NK Ester A-BPE-4" Manufactured by SHIN-NAKAMURA CHEMICAL Co., Ltd.

NK Ester A-BPE-4 is an ethoxylated bisphenol A diacrylate having a molecular weight of 512 and having, as radical polymerizable substituents, two acryloyl groups in one molecule and has an ethylenically unsaturated group equivalent of 256 g/eq.
"NK Ester A-9300" Manufactured by SHIN-NAKAMURA CHEMICAL Co., Ltd.

NK Ester A-9300 is an ethoxylated isocyanuric acid triacrylate having a molecular weight of 423 and having, as radical polymerizable substituents, three acryloyl groups in one molecule and has an ethylenically unsaturated group equivalent of 141 g/eq.

"NK Ester A-DCP" Manufactured by SHIN-NAKAMURA CHEMICAL Co., Ltd.

NK Ester A-DCP is a diacrylate with an alicyclic structure, the diacrylate having a molecular weight of 304 and having, as radical polymerizable substituents, two acryloyl groups in one molecule and has an ethylenically unsaturated group equivalent of 152 g/eq.
"NK Ester ABE-300" Manufactured by SHIN-NAKAMURA CHEMICAL Co., Ltd.

NK Ester ABE-300 is an ethoxylated bisphenol A diacrylate having a molecular weight of 466 and having, as radical polymerizable substituents, two acryloyl groups in one molecule and has an ethylenically unsaturated group equivalent of 233 g/eq.
[Monofunctional Radical Polymerizable Compound (B)]

Isobornyl acrylate (alicyclic ester acrylate monomer) whose structure is shown below.

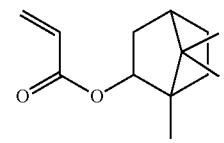

[Chem. 2]

"ACMO" (acrylamide-based monomer) which is manufactured by KJ Chemicals Corporation and whose structure is shown below.

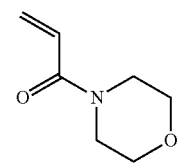

[Chem. 3]

"IMILEX-P" (maleimide-based monomer) which is manufactured by NIPPON SHOKUBAI CO., LTD. and whose structure is shown below.

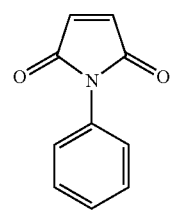

[Chem. 4]

"IMILEX-C" (maleimide-based monomer) which is manufactured by NIPPON SHOKUBAI CO., LTD. and whose structure is shown below.

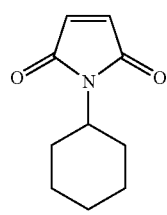

"DMAA" (acrylamide-based monomer) which is manufactured by KJ Chemicals Corporation and whose structure is shown below.

[Chem. 6]

"DAAM" (acrylamide-based monomer) which is manufactured by KJ Chemicals Corporation and whose structure is shown below.

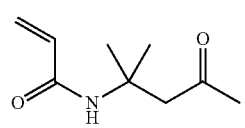

"N-Vinyl-ε-caprolactam" (N-vinyl-based monomer) which is manufactured by Tokyo Chemical Industry Co., Ltd. and whose structure is shown below.

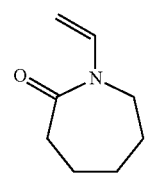

[Curing Agent (D)]

Omnirad 819 (photo-radical polymerization initiator manufactured by IGM Resins, bis(2,4,6-trimethylbenzoyl) phenylphosphine oxide)

TABLE 1

| Resin composition (parts by mass) | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Polyfunctional radical polymerizable compound (A) | KAYARAD UX6101 (3,250 g/eq) | 55.0 | 55.0 | 55.0 | 55.0 | 55.0 | 55.0 | 55.0 | 55.0 | 55.0 | 55.0 |
| Monofunctional radical polymerizable compound (B) | Isobornyl methacrylate (Alicyclic ester methacrylate-based monomer) | 45.0 | 45.0 | 45.0 | 45.0 | 45.0 | 45.0 | 45.0 | 45.0 | 45.0 | 45.0 |
| Polyethylene particles (C) | MIPELON XM-221U Molecular weight: 2,000,000 Particle diameter: 25 μm | 25.0 | 5.3 | 11.1 | 42.9 | | | 0.0 | 66.7 | | |
| | MIPELON PM-200 Molecular weight: 1,800,000 Particle diameter: 10 μm | | | | | 25.0 | | | | | |
| | MIPELON XM-220 Molecular weight: 2,000,000 Particle diameter: 30 μm | | | | | | 25.0 | | | | |
| | FLO-THENE UF20S Molecular weight: 150,000 Particle diameter: 30 μm | | | | | | | | | 25.0 | |
| | HI-ZEX MILLION 240M Molecular weight: 2,400,000 Particle diameter: 160 μm | | | | | | | | | | 25.0 |
| Curing agent (D) | Omnirad 184 | 2.0 | 2.0 | 2.0 | 2.0 | 2.0 | 2.0 | 2.0 | 2.0 | 2.0 | 2.0 |

TABLE 2

| Evaluation | | Example 3 | Example 1 | Example 2 | Example 4 | Example 5 | Example 6 | Comparative Example 1 | Comparative Example 2 | Comparative Example 3 | Comparative Example 4 |
|---|---|---|---|---|---|---|---|---|---|---|---|
| Shape formability | Evaluation | A | A | A | A | A | A | A | C | A | C |
| Specific wear rate | $mm^3 \cdot N^{-1} \cdot Km^{-1}$ | 0.014 | 0.077 | 0.019 | 0.011 | 0.010 | 0.016 | 0.610 | — | 0.505 | — |
| | Evaluation | A | A | A | A | A | A | C | — | C | — |
| Coefficient of friction | — | 0.19 | 0.63 | 0.31 | 0.14 | 0.19 | 0.22 | 1.05 | — | 0.27 | — |
| | Evaluation | A | B | B | A | A | A | C | — | A | — |
| Charpy impact test | $KJ/m^2$ | 3.9 | 3.7 | 3.9 | 1.9 | 3.7 | 3.5 | 3.9 | — | 3.8 | — |
| | Evaluation | A | A | A | B | A | A | A | — | A | — |

TABLE 3

| Resin composition (parts by mass) | | Example 7 | Example 8 | Example 9 | Example 10 | Example 11 | Example 12 |
|---|---|---|---|---|---|---|---|
| Polyfunctional radical polymerizable compound (A) | KAYARAD UX6101 (3,250 g/eq) | 40.0 | 40.0 | | | | |
| | SHIKOH UV-7550B (800 g/eq) | | | 40.0 | | | |
| | SHIKOH UV-3550AC (7,000 g/eq) | | | | 40.0 | | |
| | SHIKOH UV-6630B (1,500 g/eq) | | | | | 40.0 | 40.0 |
| | EBECRYL 8210 (150 g/eq) | | | | | | |
| | NK Ester A-BPE-4 (256 g/eq) | | | | | | 20.0 |
| | NK Ester A-9300 (141 g/eq) | | | | | | |
| | NK Ester A-DCP (152 g/eq) | | | | | 15.0 | 15.0 |
| | NK Ester ABE-300 (233 g/eq) | | | | | 20.0 | |
| Monofunctional radical polymerizable compound (B) | Isobornyl methacrylate (Alicyclic ester methacrylate-based monomer) | | | | | | |
| | Isobornyl acrylate (Alicyclic ester acrylate-based monomer) | 30.0 | | 30.0 | 30.0 | | |
| | ACMO (Acrylamide-based monomer) | 30.0 | 30.0 | 30.0 | 30.0 | | |
| | IMILEX-P (Maleimide-based monomer) | | 15.0 | | | | |
| | IMILEX-C (Maleimide-based monomer) | | 15.0 | | | | |
| | DMAA (Acrylamide-based monomer) | | | | | 25.0 | 25.0 |
| | DAAM (Acrylamide-based monomer) | | | | | | |
| | N-Vinyl-ε-caprolactam (N-Vinyl-based monomer) | | | | | | |
| Polyethylene particles (C) | MIPELON XM-221U Molecular weight: 2,000,000 Particle diameter: 25 μm | 25.0 | 25.0 | 25.0 | 25.0 | 25.0 | 25.0 |
| Curing agent (D) | Omnirad 184 | | | | | | |
| | Omnirad 819 | 2.0 | 2.0 | 2.0 | 2.0 | 2.0 | 2.0 |

| Resin composition (parts by mass) | | Example 13 | Example 14 | Example 15 | Comparative Example 5 | Comparative Example 6 |
|---|---|---|---|---|---|---|
| Polyfunctional radical polymerizable compound (A) | KAYARAD UX6101 (3,250 g/eq) | | | | | |
| | SHIKOH UV-7550B (800 g/eq) | | | | | |
| | SHIKOH UV-3550AC (7,000 g/eq) | | | | | |
| | SHIKOH UV-6630B (1,500 g/eq) | 40.0 | 40.0 | 40.0 | | |
| | EBECRYL 8210 (150 g/eq) | | | | 55.0 | |
| | NK Ester A-BPE-4 (256 g/eq) | 15.0 | | | | 41.3 |
| | NK Ester A-9300 (141 g/eq) | | | | | 13.7 |

TABLE 3-continued

| | | Example 7 | Example 8 | Example 9 | Example 10 | Example 11 | Example 12 | Example 13 | Example 14 | Example 15 | Comparative Example 5 | Comparative Example 6 |
|---|---|---|---|---|---|---|---|---|---|---|---|---|
| | NK Ester A-DCP (152 g/eq) | | | | | | | | | | 15.0 | 2.5 | 15.0 |
| | NK Ester ABE-300 (233 g/eq) | | | | | | | | | | | 5.0 | |
| Monofunctional radical polymerizable compound (B) | Isobornyl methacrylate (Alicyclic ester methacrylate-based monomer) | | | | | | | | 45.0 | 45.0 | | |
| | Isobornyl acrylate (Alicyclic ester acrylate-based monomer) | | | | | | | | | | | |
| | ACMO (Acrylamide-based monomer) | | | 37.5 | | | | | | | | |
| | IMILEX-P (Maleimide-based monomer) | | | | 20.0 | | | | | | | |
| | IMILEX-C (Maleimide-based monomer) | | | | | | | | | | | |
| | DMAA (Acrylamide-based monomer) | 15.0 | | | | | | | | | | |
| | DAAM (Acrylamide-based monomer) | | 15.0 | | | | | | | | | |
| | N-Vinyl-ε-caprolactam (N-Vinyl-based monomer) | | | | | | 40.0 | | | | | |
| Polyethylene particles (C) | MIPELON XM-221U Molecular weight: 2,000,000 Particle diameter: 25 μm | 25.0 | 25.0 | 25.0 | 25.0 | 25.0 | | | | | | |
| Curing agent (D) | Omnirad 184 | | | | | | | | 2.0 | 2.0 | | |
| | Omnirad 819 | 2.0 | 2.0 | 2.0 | | | | | | | | |

TABLE 4

| | Evaluation | Example 7 | Example 8 | Example 9 | Example 10 | Example 11 | Example 12 | Example 13 | Example 14 | Example 15 | Comparative Example 5 | Comparative Example 6 |
|---|---|---|---|---|---|---|---|---|---|---|---|---|
| Shape formability | Evaluation | A | A | A | A | A | A | A | A | A | A | A |
| Specific wear rate | $mm^3 \cdot N^{-1} \cdot Km^{-1}$ | 0.011 | 0.310 | 0.330 | 0.100 | 0.099 | 0.141 | 0.104 | 0.005 | 0.091 | 0.007 | 0.020 |
| | Evaluation | A | B | B | A | A | B | B | A | A | A | A |
| Coefficient of friction | — | 0.19 | 0.29 | 0.25 | 0.27 | 0.18 | 0.24 | 0.23 | 0.15 | 0.24 | 0.27 | 0.22 |
| | Evaluation | A | A | A | A | A | A | A | A | A | A | A |
| Charpy impact test | $KJ/m^2$ | 3.4 | 1.1 | 1.3 | 3.2 | 4.5 | 5.0 | 5.2 | 3.5 | 3.7 | 0.0 | 0.0 |
| | Evaluation | A | B | B | A | A | A | A | A | A | C | C |

As can be seen from Tables 2 and 4, Examples 1 to 15 according to the present invention each exhibited good shape formability. In addition, regarding specimens X and specimens Y prepared by curing the curable resin compositions according to the present invention, the specimens X had a Charpy impact strength of 1.0 KJ/m² or more, and the specimens Y had a coefficient of friction of less than 0.7 and a specific wear rate of less than 0.5 mm³·N⁻¹·Km⁻¹. That is, it was confirmed that the use of the photo-curable resin compositions according to the present invention provides articles having both good toughness and high slidability.

In the results in Table 2, Comparative Example 1, in which no polyethylene particles (C) were added, could not satisfy the evaluation criteria B of the specific wear rate and the coefficient of friction. In Comparative Example 2, in which the amount of the polyethylene particles (C) added was 66.7 parts by mass, the three-dimensional shaped article could not be produced because of an increase in viscosity. There results and the results of Examples 1 to 6 confirmed that the amount of the polyethylene particles (C) added was preferably 5 to 50 parts by mass relative to 100 parts by mass of the total of the polyfunctional radical polymerizable compound (A) and the monofunctional radical polymerizable compound (B).

Furthermore, Comparative Example 3, in which the added polyethylene particles (C) had a viscosity-average molecular weight of 150,000, could not satisfy the evaluation criterion B of the specific wear rate. This result and the results of Examples 1 to 6 showed that the viscosity-average molecular weight of the polyethylene particles (C) is preferably 1,500,000 or more.

In shaping with the 3D printer, in Comparative Example 4, in which the added polyethylene particles (C) had an average particle diameter of more than 50 μm, the three-dimensional shaped article could not be produced because the particle diameter is larger than the layer thickness of one layer. Considering the results of Examples 1 to 6, the average particle diameter of the polyethylene particles (C) is preferably 50 μm or less, although it depends on the use of the apparatus used for shaping and shaping conditions.

The results in Table 4 showed that Examples 7 to 15, in which the polyfunctional radical polymerizable compound (A) included in each photo-curable resin composition had an ethylenically unsaturated group equivalent of 700 g/eq or more, exhibited good results in all the items. However, in Comparative Examples 5 and 6, in which the polyfunctional radical polymerizable compound (A) included in each photo-curable resin composition had an ethylenically unsaturated group equivalent of less than 700 g/eq, the Charpy impact test did not satisfy the evaluation criterion B, and good toughness could not be obtained. These results showed that the ethylenically unsaturated group equivalent of the radical polymerizable compound (A) is preferably 700 g/eq or more.

The present invention is not limited to the above-described embodiments, and various changes and modifications may be made without departing from the spirit and scope of the present invention. Thus, the following claims are appended in order to disclose the scope of the present invention.

The invention claimed is:

1. A photo-curable resin composition, the photo-curable resin composition comprising a polyfunctional radical polymerizable compound (A), a monofunctional radical polymerizable compound (B), polyethylene particles (C), and a curing agent (D),
wherein the polyethylene particles (C) has an average particle diameter of 50 μm or less and a viscosity-average molecular weight of 1,500,000 or more,
a content of the polyethylene particles (C) is 5 parts by mass or more and 50 parts by mass or less relative to 100 parts by mass of a total of the polyfunctional radical polymerizable compound (A) and the monofunctional radical polymerizable compound (B), and
a viscosity of the curable resin composition is 50 mPa·s or more and 30,000 mPa·s or less.

2. The photo-curable resin composition according to claim 1, wherein the polyfunctional radical polymerizable compound (A) is a mixture of a polyfunctional radical polymerizable compound having an ethylenically unsaturated group equivalent of 700 g/eq or more and 8,000 g/eq or less and a polyfunctional radical polymerizable compound having an ethylenically unsaturated group equivalent of less than 700 g/eq.

3. The photo-curable resin composition according to claim 1, wherein a content of the polyfunctional radical polymerizable compound (A) is 20 parts by mass or more and 75 parts by mass or less relative to 100 parts by mass of the total of the polyfunctional radical polymerizable compound (A) and the monofunctional radical polymerizable compound (B).

4. The photo-curable resin composition according to claim 1, wherein an ethylenically unsaturated group equivalent of the polyfunctional radical polymerizable compound (A) is 700 g/eq or more and 8,000 g/eq or less.

5. The photo-curable resin composition according to claim 1, wherein the polyethylene particles (C) have an average particle diameter of 10 μm or more and 30 μm or more less.

6. The photo-curable resin composition according to claim 1, wherein the polyfunctional radical polymerizable compound (A) is a single polyfunctional radical polymerizable compound having an ethylenically unsaturated group equivalent of 700 g/eq or more and 8,000 g/eq or less or a mixture including a plurality of types of polyfunctional radical polymerizable compounds and having an ethylenically unsaturated group equivalent of 700 g/eq or more and 8,000 g/eq or less, the ethylenically unsaturated group equivalent being a weighted average of ethylenically unsaturated group equivalents of the polyfunctional radical polymerizable compounds in terms of weight ratio.

7. The photo-curable resin composition according to claim 6, wherein the polyethylene particles (C) have a viscosity-average molecular weight of 1,800,000 or more.

8. The photo-curable resin composition according to claim 1, wherein the monofunctional radical polymerizable compound (B) is selected from an acrylamide-based compound, a (meth) acrylate-based compound, a maleimide-based compound, and an N-vinyl compound.

9. The photo-curable resin composition according to claim 1, wherein the polyfunctional radical polymerizable compound (A) is a (meth)acrylate-based or urethane (meth) acrylate-based compound having a polyether structure, a polyester structure, or a polycarbonate structure.

10. The photo-curable resin composition to claim 1, wherein the curing agent (D) includes a photo-radical polymerization initiator.

11. A cured product obtained by copolymerization of the photo-curable resin composition according to claim 1.

12. The cured product according to claim 11, having a specific wear rate of less than 0.5 $mm^3 \cdot N^{-1} \cdot Km^{-1}$.

13. The cured product according to claim 11, having a coefficient of friction of less than 0.7.

14. A method for producing a three-dimensional article, the method being a method for producing an article using stereolithography,
the method comprising:
a step of disposing a photo-curable resin composition on a shaping surface; and
a step of irradiating the photo-curable resin composition with light energy based on slice data of a shaping model to cure the photo-curable resin composition,
wherein the photo-curable resin composition is the photo-curable resin composition according to claim 1.

15. The method for producing a three-dimensional article according to claim 14, further comprising a step of subjecting a shaped product obtained by irradiation with the light energy to heat treatment.

16. The method for producing a three-dimensional article according to claim 13, wherein the light energy is light emitted from a laser light source or a projector.

17. The photo-curable resin composition according to claim 1, wherein the amount of the monofunctional radical polymerizable compound (B) included in the curable resin composition is 25 parts by mass or more and 80 parts by mass or less relative to 100 parts by mass of the total of the polyfunctional radical polymerizable compound (A) and the monofunctional radical polymerizable compound (B).

18. The photo-curable resin composition according to claim 1, wherein the amount of the curing agent (D) included in the curable resin composition is 0.1 parts by mass or more and 15 parts by mass or less relative to 100 parts by mass of the total of the polyfunctional radical polymerizable compound (A) and the monofunctional radical polymerizable compound (B).

19. The photo-curable resin composition according to claim 1, wherein the average particle diameter of the polyethylene particles (C) is 1 μm to 50 μm.

20. The photo-curable resin composition according to claim 1, wherein the polyfunctional radical polymerizable compound (A) has a urethane structure.

* * * * *